(12) United States Patent
Zakarauskas (10) Patent No.: US 7,117,149 B1
(45) Date of Patent: Oct. 3, 2006

(54) SOUND SOURCE CLASSIFICATION

(75) Inventor: Pierre Zakarauskas, Vancouver (CA)

(73) Assignee: Harman Becker Automotive Systems-Wavemakers, Inc., Vancouver (CA)

( * ) Notice: Subject to any disclaimer, the term of this patent is extended or adjusted under 35 U.S.C. 154(b) by 0 days.

(21) Appl. No.: 09/385,975

(22) Filed: Aug. 30, 1999

(51) Int. Cl.
G10L 15/20 (2006.01)

(52) U.S. Cl. ..................... 704/233; 704/226

(58) Field of Classification Search ............... 704/233, 704/241, 243, 201, 205, 226
See application file for complete search history.

(56) References Cited

U.S. PATENT DOCUMENTS

| | | | |
|---|---|---|---|
| 4,843,562 A * | 6/1989 | Kenyon et al. ............... 702/73 |
| 5,027,410 A | 6/1991 | Williamson et al. |
| 5,146,539 A * | 9/1992 | Doddington et al. ....... 704/241 |
| 5,313,555 A * | 5/1994 | Kamiya ...................... 704/233 |
| 5,502,688 A * | 3/1996 | Recchione et al. ......... 367/131 |
| 5,680,508 A | 10/1997 | Liu |
| 5,933,801 A | 8/1999 | Fink et al. |
| 5,949,888 A | 9/1999 | Gupta et al. |
| 6,167,375 A | 12/2000 | Miseki et al. |
| 6,173,074 B1 * | 1/2001 | Russo ....................... 382/190 |

FOREIGN PATENT DOCUMENTS

| | | |
|---|---|---|
| EP | 0 629 996 A | 12/1994 |
| EP | 0 629 996 A2 | 12/1994 |
| EP | 0 629 996 A3 | 12/1994 |
| EP | 0 750 291 A1 | 12/1996 |

OTHER PUBLICATIONS

Quatieri, T.F. et al, "Noise Reduction Using a Soft-Decision Sine-Wave Vector Quantizer," IEEE International Conference on Acoustics, Speech & Signal Proceesing, Apr. 3, 1990, pp. 821-824. vol. 15.*

(Continued)

Primary Examiner—Angela Armstrong
(74) Attorney, Agent, or Firm—Brinks Hofer Gilson & Lione (57) ABSTRACT

A system and method to identify a sound source among a group of sound sources. The invention matches the acoustic input to a number of signal models, one per source class, and produces a goodness-of-match number for each signal model. The sound source is declared to be of the same class as that of the signal model with the best goodness-of-match if that score is sufficiently high. The data are recorded with a microphone, digitized and transformed into the frequency domain. A signal detector is applied to the transient. A harmonic detection method can be used to determine if the sound source has harmonic characteristics. If at least some part of a transient contains signal of interest, the spectrum of the signal after resealing is compared to a set of signal models, and the input signal's parameters are fitted to the data. The average distortion is calculated to compare patterns with those of sources that used in training the signal models. Before classification can occur, a source model is trained with signal data. Each signal model is built by creating templates from input signal spectrograms when they are significantly different from existing templates. If an existing template is found that resembles the input pattern, the template is averaged with the pattern in such a way that the resulting template is the average of all the spectra that matched that template in the past.

14 Claims, 5 Drawing Sheets

OTHER PUBLICATIONS

Quatieri, T.F. et al., Noise Reduction Using a Soft-Detection Sine-Wave Vector Quantizer, International Conference on Acoustics, Speech & Signal Processing, Apr. 3, 1990, pp. 821-824, vol. Conf. 15, IEEE ICASSP, New York, US, XP0001466895, Abstract, Paragraph 3.1

Learned, R. E. et al., A Wavelet Packet Approach to Transient Signal Classification, Applied and Computational Harmonic Analysis, Jul. 1995, pp. 265-278, vol. 2, No. 3, USA, XP000972660. ISSN: 1063-5203. abstract.

Quelavoine, R. et al., Transients Recognition in Underwater Acoustics with Multilayer Neural Networks, Engineering Benefits from Neural Networks, Proceedings of the International Conference EANN 1998, Gibralter, Jun. 10-12, 1998, pp. 330-333, XP000974500. 1998, Turku, Finland, Syst. Eng. Assoc, Finland. ISBN: 951-97868-0-5. abstract, p. 30, paragraph 1.

Zakarauskas, P., Detection and Localization of Nondeterministic Transients in Time Series and Application to Ice-Cracking Sound, Digital Signal Processing, 1993, vol. 3, No. 1, pp. 36-45, Academic Press, Orlando, FL, USA, XP000361270. ISSN: 1051-2004. entire document.

Simon, G., Detection of Harmonic Burst Signals, International Journal Circuit Theory and Applications, Jul. 1985, vol. 13, No. 3, pp. 195-201, UK, XP000974305. ISSN: 0098-9886. abstract.

\* cited by examiner

FIG. 1

Prior art computer system

FIG. 2
Speaker Recognition

FIG. 3

Background noise estimation and signal detection

FIG. 4
Harmonic detector

FIG. 5
Pattern matching routine

SOUND SOURCE CLASSIFICATION

TECHNICAL FIELD

This invention relates to systems and methods for automatic classification of acoustic (sound) sources, including text-independent speaker identification.

BACKGROUND

There are several fields of research studying acoustic signal classification. Each field of research has adopted its own approaches to acoustic signal classification, with some overlap between them. At present, the main applications for automatic sound source classification are: speaker verification; speaker identification; passive sonar classification; and machine noise monitoring or diagnostics.

Speaker verification aims at verifying that a given speaker is indeed who he or she claims to be. In most speaker verification systems, a speaker cooperates in saying a keyword, and the system matches the way that keyword was said by the putative speaker with training samples of the same keywords. If the match is poor, the speaker is rejected or denied service (e.g., computer or premise access). A disadvantage of such methods is that the same keyword must be used at testing time as at training time, thus limiting application of such methods to access control. This method could not be used to label the speakers in a back-and-forth conversation for example.

Speaker identification aims at determining which among a set of voices best matches a given test utterance. Text-independent speaker identification tries to make such a determination without the use of particular keywords.

Passive sonar classification involves identifying a vessel according to the sound it radiates underwater. Machine noise monitoring and diagnostics involves determining the state of a piece of machinery through the sound it makes.

In all of the above applications, a model of each sound source is first obtained by training a system with a set of example sounds from each source. A test sample is then compared to the stored models to determine a sound source category for the test sample. Known methods require relatively long training times and testing samples that make such methods inappropriate in many cases. Further, such methods tend to require a large amount of memory storage and computational resources. Finally, these methods often are not robust to the presence of noise in the test signal, which prevents their use in many tasks. ("Signal" means a signal of interest; background and distracting sounds are referred to as "noise").

The inventor has determined that it would be desirable to be able to classify an acoustic signal even when some portions of the spectra are masked by noise, and require a minimum amount of training and testing. The present invention provides a system and method for acoustic signal classification that avoids the limitations of prior techniques.

SUMMARY

The invention includes a method, apparatus, and computer program to classify a sound source. The invention matches the acoustic input to a number of signal models, one per source class, and produces a score for each signal model. The sound source is declared to be of the same class as that of the model with the best score if that score is sufficiently high. In the preferred embodiment, classification is accomplished by the use of a signal model augmented by learning.

The input signal may represent human speech, in which case the goal would be to identify the speaker in a text-independent manner. However, it should be recognized that the invention may be used to classify any type of live or recorded acoustic data, such as musical instruments, birds, engine or machine noise, or human singing.

The preferred embodiment of the invention classifies input signals as follows. An input signal is digitized into binary data, which is transformed to a time-frequency representation (spectrogram). Background noise is estimated and a signal detector isolates periods containing signal. Periods without signal content are included in the noise estimate. The spectrogram of the input signal is rescaled and compared to spectrograms for a number of templates defining a signal model, where each signal model represents a source class. The average distortion between the measured spectrograms and the spectrograms of each signal model is calculated. The signal model with the lowest distortion is selected. If the average distortion of the selected signal model is sufficiently low, the source is declared to belong to the corresponding class. If not, the source is declared to be of unknown type.

The set of signal models is trained with signal data by creating templates from the spectrograms of the input signals when such spectrograms are significantly different from the spectrograms of existing templates. If an existing template is found that resembles the input signal spectrogram, that template is averaged with the input signal spectrogram in such a way that the resulting template is the average of all the spectra that matched that template in the past.

The invention has the following advantages: It is able to classify an acoustic signal source: independently of the sound the source happens to be emitting at the time of sampling; independently of sound levels; and even when some portions of the spectra of the acoustic signal are masked by noise. The invention also requires relatively few training, testing data, and computational resources.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Throughout this description, the preferred embodiment and examples shown should be considered as exemplars rather than as limitations of the invention.

Overview of Operating Environment

Figure 1:
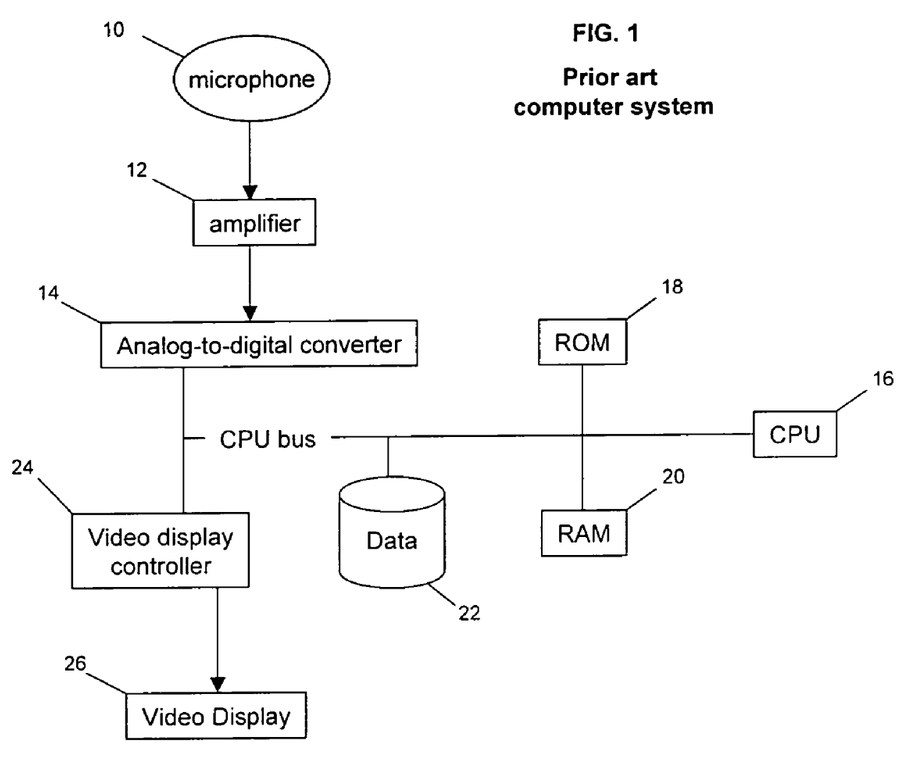
FIG. 1 is block diagram of a prior art programmable computer system suitable for implementing the signal enhancement technique of the invention.

FIG. 1 shows a block diagram of a typical prior art programmable processing system which may be used for implementing the acoustic signal classification system of the invention. An acoustic signal is received at a transducer microphone 10, which generates a corresponding electrical signal representation of the acoustic signal. The signal from the transducer microphone 10 is then preferably amplified by an amplifier 12 before being digitized by an analog-to-digital converter 14. The output of the analog-to-digital converter 14 is applied to a processing system, which applies the classification techniques of the invention. The processing system preferably includes a CPU 16, RAM 20, ROM 18 (which may be writable, such as a flash ROM), and an optional storage device 22, such as a magnetic disk, coupled by a CPU bus as shown. The output of the classification process can be displayed for the benefit of a human user by means of a video display controller 24 which drives a video display 26, or used by the system to customize its response to the identity of the sound source, or used to actuate external equipment (e.g., lock mechanisms in an access control application).

Functional Overview of System

The following describes the functional components of an acoustic signal classification system. A first functional component of the invention is a pre-processor that transforms input data to a time-frequency representation. The patterns of the relative power in different frequency bands and how such patterns change in the short term are used by the present system to classify an input signal.

The second and third functional components of the invention are a dynamic background estimator and a signal detector respectively, working in tandem. A signal detector is useful to discriminate against continuous background noise. It is important to ensure that classification is based on signal only, and is not influenced by background noise. The dynamic background noise estimation function is capable of separating transient sounds from background noise, and estimating the background noise alone. In one embodiment, a power detector acts in each of multiple frequency bands. Noise-only portions of the data are used to generate mean and standard deviation of the noise in decibels (dB). When the power exceeds the mean by more than a specified number of standard deviations in a frequency band, the corresponding time period is flagged as containing signal and is not used to estimate the noise-only spectrum.

The fourth functional component of the invention is a harmonic detector. In the case of harmonic sounds, the harmonic detector is also used to provide an estimate for the fundamental frequency of the signal that can be useful for classification. A harmonic detector is a useful filter to apply to the data since in many cases of interest (e.g., human voice, music, bird singing, engine and machinery), the signal has a harmonic structure. A preferred embodiment of a harmonic detector is described below. The harmonic detector counts the number of harmonically related peaks in the spectrum.

The fifth functional component is a spectral rescaler. The input signal can be weak or strong, close or far. Before measured spectra are matched against templates in a model, the measured spectra are rescaled so that the inter-pattern distance does not depend on the overall loudness of the signal. In the preferred embodiment, a weighting proportional to the signal-to-noise ratio (SNR) in decibels (dB) is applied to the frequency bands during rescaling. The weights are bounded below and above by a minimum and a maximum value, respectively. The spectra are rescaled so that the weighted distance to each stored template is minimized.

The sixth functional component is a pattern matcher. The pattern matcher compares the spectrogram of the input signal to a set of signal models, each defining a class. Each signal model consists of a set of prototypical spectrograms of short duration ("templates") obtained from signals of known identity. Signal model training is accomplished by collecting spectrograms that are significantly different from prototype spectrograms previously collected. In the preferred embodiment, the first prototype spectrogram is the first input signal spectrogram containing signal significantly above the noise level. For subsequent time epochs, if the input signal spectrogram is closer to any existing prototype spectrogram than a selected distance threshold, then that input signal spectrogram is averaged with the closest prototype spectrogram. If the input signal spectrogram is farther away from any prototype spectrogram than the selected threshold, then the input signal spectrogram is declared to be a new prototype spectrogram.

The distance between templates and the measured spectrogram of the input signal can be one of several appropriate metrics, such as the Euclidean distance or a weighted Euclidean distance. For each signal model class, the template with the smallest distance to the measured input signal spectrogram is selected as the best fitting prototype spectrogram for that class.

The seventh functional component is a classifier. A score for each class is accumulated for each input signal sample. When sufficient data has been collected from a suitable number of input signal samples, a final classification decision is made. Alternatively, a decision can be forced at any desired time or event (for example, if a period of speech is followed by a significant period of silence), and the best fitting class returned along with the score at that point.

Overview of Basic Method

Figure 2:
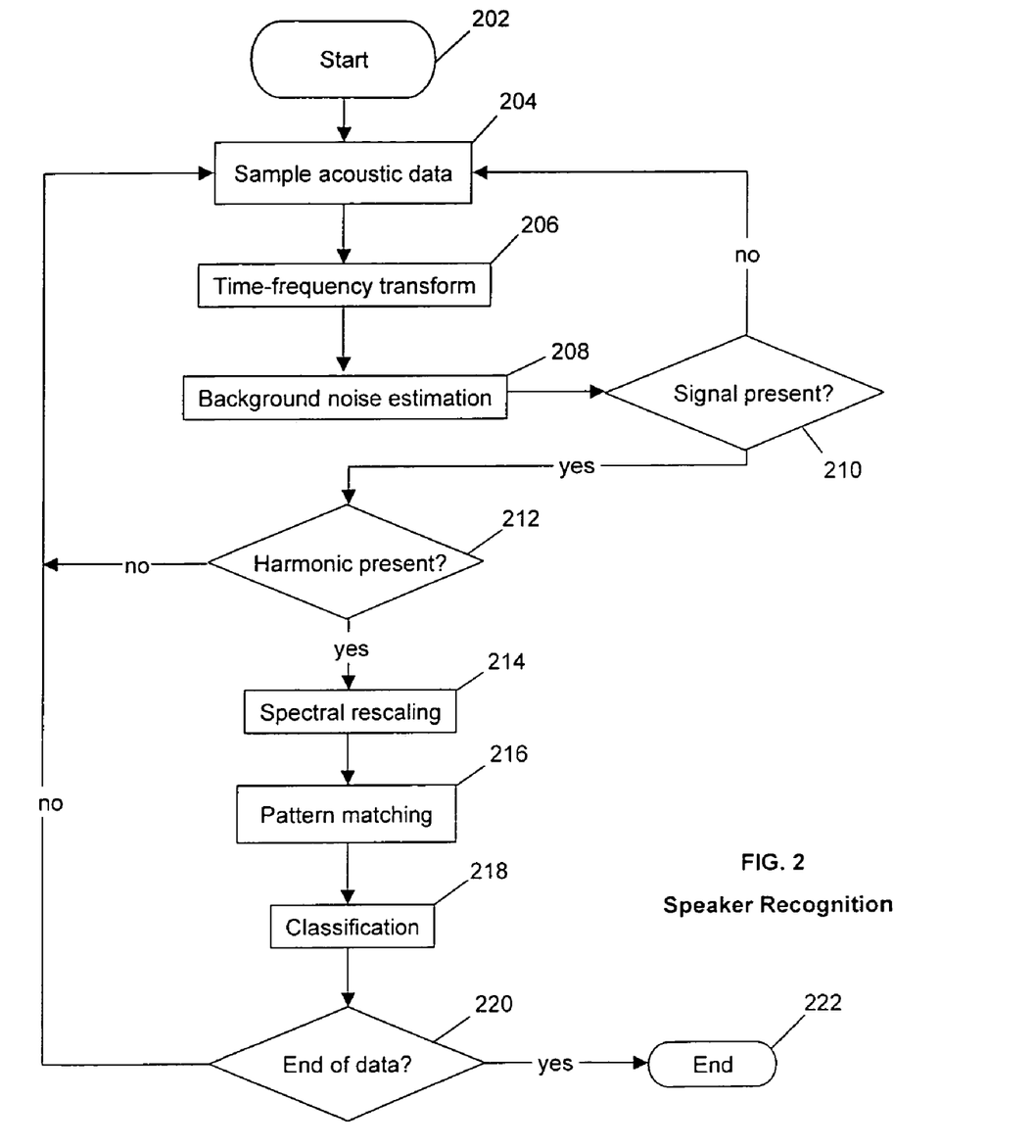
FIG. 2 is a flow diagram showing the basic method of the preferred embodiment of the invention.

FIG. 2 is a flow diagram of the preferred method embodiment of the invention. The method shown in FIG. 2 is used for enhancing an incoming acoustic signal, which consists of a plurality of data samples generated as output from the analog-to-digital converter 14 shown in FIG. 1. The method begins at a Start state (Step 202). The incoming data stream (e.g., a previously generated acoustic data file or a digitized live acoustic signal) is read into a computer memory as a set of samples (Step 204). In the preferred embodiment, the invention normally would be applied to classify from a "moving window" of data representing portions of a continuous acoustic data stream, such that the entire data stream is processed. Generally, an acoustic data stream to be classified is represented as a series of data "buffers" of fixed length, regardless of the duration of the original acoustic data stream.

The samples of a current window are subjected to a time-frequency transformation, which may include appropriate conditioning operations, such as pre-filtering, shading, etc. (Step 206). Any of several time-frequency transforms can be used, such as the short-time Fourier transform, banks of filter analysis, discrete wavelet transform, etc.

The result of the time-frequency transformation is that the initial time series input signal $x(t)$ is transformed into a time-frequency representation $X(f, i)$, where t is the sampling index to the time series x, and f and i are discrete variables respectively indexing the frequency and time dimensions of spectrogram X. In the preferred embodiment, the logarithm of the magnitude of X is used instead of X in subsequent steps unless specified otherwise, i.e.:

$$P(f,i)=20\log_{10}(|X(f,i)|).$$

The power level P(f,i) as a function of time and frequency will be referred to as a "spectrogram" from now on.

The power levels in individual frequency bands fare then subjected to background noise estimation (Step 208). A signal detector detects the presence of signal buried in stationary background noise (Step 210), and passes only spectrograms that include signal. The background noise estimation updates the estimate of the background noise parameters when no signal is present.

A preferred embodiment for performing background noise estimation comprises a power detector that averages the acoustic power in a sliding window for each frequency band f. When the power within a predetermined number of frequency bands exceeds a threshold, determined as a certain number of standard deviations above the background noise, the power detector declares the presence of signal, i.e., when:

$$P(f,i) > B(f) + c\sigma(f),$$

where B(f) is the mean background noise power in band f, σ(f) is the standard deviation of the noise in that same band, and c is a constant. In an alternative embodiment, noise estimation need not be dynamic, but could be measured once (for example, during boot-up of a computer running software implementing the invention).

The spectrograms that are passed through the signal detector are then applied to a harmonic detector function (Step 212). This step allows the system to discriminate against signals that are not of the same harmonic class as the input signal and therefore for which no further comparison is necessary. For example, the human voice is characterized by the presence of a set of harmonics between 0.1 and about 3 kHz, with a fundamental frequency (pitch) of between 90 Hz for adult males to 300 Hz for children.

The spectrograms P from Step 206 are then preferably rescaled so that they can be compared to stored templates (Step 214). One method of performing this step is to shift each element of the spectrogram P(f, i) up by a constant k(i, m) so that the root-mean-squared difference between P(f, i)+k(i, m) and the $m^{th}$ template T(f, m) is minimized. This is accomplished by taking the following, where N is the number of frequency bands:

$$k(i,m) = \frac{1}{N}\sum_{f=1}^{N}[P(f,i)-T(f,m)]$$

In another embodiment, weighting is used to rescale the templates prior to comparison. The weights w(i) are proportional to the SNR r(f, i) in band f at time i, calculated as a difference of levels, i.e. r(f, i)=P(f, i)−B(f) for each frequency band. In this embodiment, each element of the rescaling factor is weighted by a weight defined as follows, where $w_{min}$ and $w_{max}$ are preset thresholds:

$$w(f,i)=w_{min} \text{ if } r(f,i)<w_{min};$$

$$w(f,i)=w_{max} \text{ if } r(f,i)>w_{max};$$

$$w(f,i)=r(f,i) \text{ otherwise}.$$

In the preferred embodiment, the weights are normalized by the sum of the weights at each time frame, i.e.:

$$w'(f,i)=w(f,i)/\text{sum}_f(w(f,i)),$$

$$w'_{min}=w_{min}/\text{sum}_f(w(f,i)),$$

$$w'_{max}=w_{max}/\text{sum}_f(w(f,i)).$$

In that case, the rescaling constant is given by:

$$k(i,m) = \frac{1}{N}\sum_{f=1}^{N}[P(f,i)-T(f,m)]w'(f,i)$$

The effect of such rescaling is to preferentially align the frequency bands of the templates having a higher SNR. However, rescaling is optional and need not be used in all embodiments.

In another embodiment, the SNR of the templates is used as well as the SNR of the measured spectra for rescaling the templates. The SNR of template T(f, m) is defined as $r_N$(f, m)=T(f, m)−$B_N$(f), where $B_N$(f) is the background noise in frequency band f at the time of training. In one embodiment of a weighting scheme using both r and $r_N$, the weights $w_N$ are defined as the square-root of the product of the weights for the templates and the spectrogram:

$$w_2(f,i,m)=w_{min} \text{ if } \sqrt{r_N(f,m)r(f,i)}<w_{min};$$

$$w_2(f,i,m)=w_{max} \text{ if } \sqrt{r_N(f,m)r(f,i)}>w_{max};$$

$$w_2(f,i,m)=\sqrt{r_N(f,m)r(f,i)}>w_{max} \text{ otherwise}.$$

Other combinations of $r_N$ and r are admissible. In the preferred embodiment, the weights are normalized by the sum of the weights at each time frame, i.e.:

$$w'_2(f,i)=w_2(f,i)/\text{sum}_f(w_2(f,i)),$$

$$w'_{min}=w_{min}/\text{sum}_f(w_2(f,i)),$$

$$w'_{max}=w_{max}/\text{sum}_f(w_2(f,i)).$$

After spectral rescaling, the preferred embodiment performs pattern matching to find a template T* in a signal model that best matches the current spectrogram P(f, i) (Step 216). There exists some latitude in the definition of the term "best match", as well as in the method used to find that best match. In one embodiment, the template with the smallest r.m.s. (root mean square) difference d* between P+k and T* is found. In the preferred embodiment, the weighted r.m.s. distance is used, where:

$$d(i,m) = \frac{1}{N}\sum_{f=1}^{N}[P(f,i)+k(i,m)-T(f,m)]^2 w'_2(f,i,m)$$

In this embodiment, the frequency bands with the least SNR contribute less to the distance calculation than those bands with more SNR. The best matching template T*(i) at time i is selected by finding m such that d*(i)=$\min_m$(d(i,m)).

The last component is a classifier. A score for each class is accumulated, and when sufficient data has been collected, a decision is made. For example, a score can be the average of the distances d(i,m) over time i. In a typical embodiment, 8–20 scores are accumulated, each corresponding to a buffer of voiced speech (as opposed to unvoiced speech—consonants—since the buffers without voiced speech do not contain as much information as to the identity of the speaker. The classification decision may simply comprise comparing a score to a threshold, resulting in a binary determination, or one can use a "soft" classifier, such as a neural network. Alternatively, a decision can be forced at any desired time or event, and the best fitting class is returned, along with the score at that point. The score can include a component that relates the contribution of the fundamental frequency to the total score. The preferred embodiment of that component is of the form $K(f_0-f_{source})^2$, where $f_0$ is the measured fundamental frequency, $f_{source}$ is the fundamental frequency of the source model, and K is a proportionality constant.

More particularly, in the preferred embodiment, the score is the average of the distance over time, plus a fundamental frequency term, i.e., $$s = \frac{1}{N}\sum_{i=I}^{I+N} d^*(i) + K(f_0 - f_{source})^2$$

where the average is taken over N points starting at time i=I. In this case, the score s needs to be minimized. If s does not meet a selected threshold value $T_{unknown}$ for all models, then the source is declared to be of "unknown" type. Otherwise, the source is declared to belong to the class with the lowest score.

Single or multiple signal models, each comprising one or more templates, may be applied in various applications to classify an input acoustic signal. In the case of a single signal model, the classification is binary.

Background Noise Estimation and Signal Detection

Figure 3:
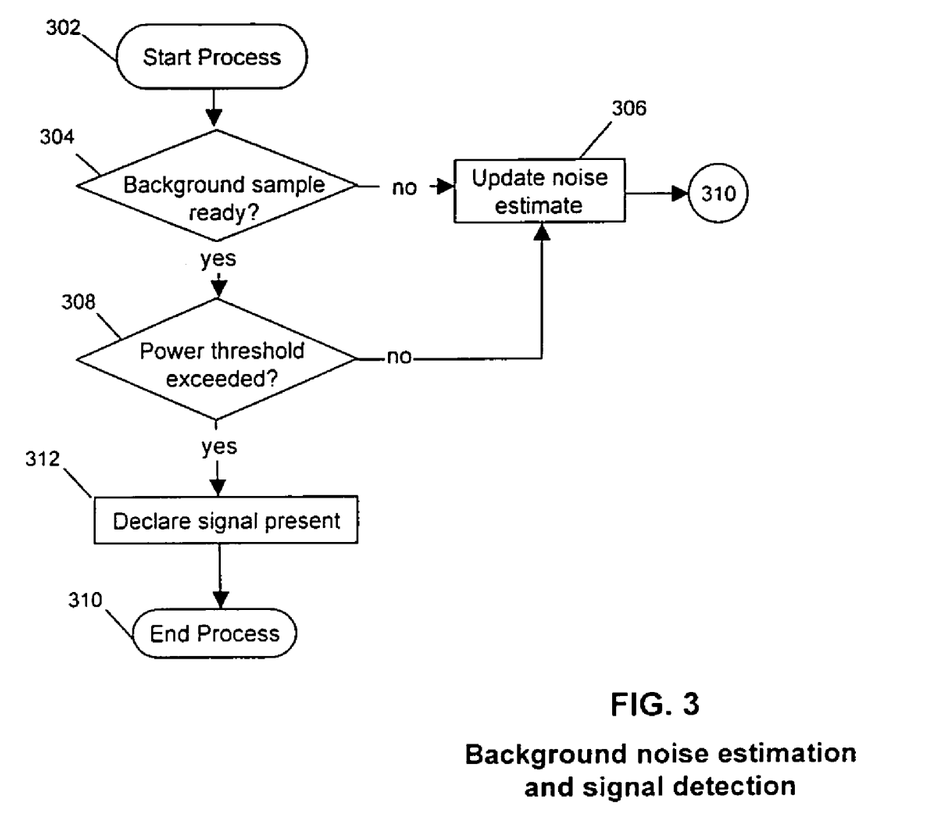
FIG. 3 is a flow diagram showing a preferred process for estimating background noise parameters and detecting the presence of signal.

FIG. 3 is a flow diagram providing a more detailed description of the process of background noise estimation and signal detection which were briefly described as Steps 208 and 210 respectively in FIG. 2. The background noise estimation updates the estimates of the background noise parameters when no signal is present. A signal detector is useful to discriminate against continuous background noise. It is important to ensure that classification is based on signal only, and is not influenced by the background noise.

The process begins at a Start Process state (Step 302). The process needs a sufficient number (e.g., 1 second) of samples of background noise before it can use the mean and standard deviation of the noise to detect signal. Accordingly, the routine determines if a sufficient number of samples of background noise have been obtained (Step 304). If not, the present sample is used to update the noise estimate (Step 306) and the process is terminated (Step 310). In one embodiment of the background noise update process, the spectrogram elements P(f, i) are kept in a ring buffer and used to update the mean B(f) and the standard deviation σ(f) of the noise in each frequency band f. The background noise estimate is considered ready when the index i is greater than a preset threshold.

If the background samples are ready (Step 304), then a determination is made as to whether the signal level P(f, i) of a current input signal sample is significantly above the background in some of the frequency bands (Step 308). In a preferred embodiment, when the power within a predetermined number of frequency bands is greater than a threshold, determined as a certain number of standard deviations above the background noise mean level, the determination step indicates that the power threshold has been exceeded, i.e., when $P(f,i)>B(f)+c\sigma(f),$ where c is a constant predetermined empirically (Step 312). The process then ends (Step 310). If a sufficiently powerful signal is not detected in Step 308, then the background noise statistics are updated in Step 306 and the process then ends (Step 310).

Harmonic Detector

Figure 4:
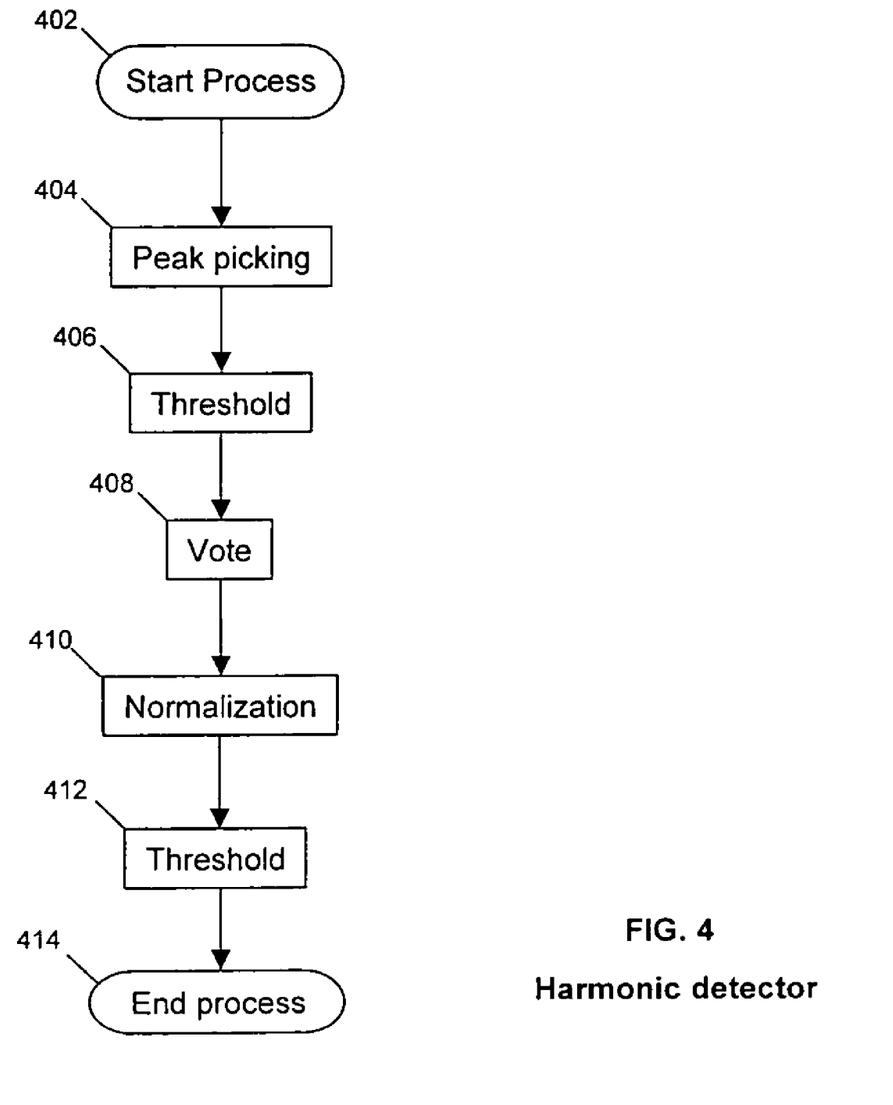
FIG. 4 is a flow diagram showing the preferred method to detect the presence of harmonically related peaks in a signal spectrum.

FIG. 4 is a flow diagram providing a more detailed description of the process of harmonic detection which was briefly described as Step 212 in FIG. 2. The harmonic detector detects the presence of peaks in the spectrum of an input signal sample that have a harmonic relation between them. This step is often useful, since a large proportion of sources of interest have spectra that are characterized as having a harmonic relationship between their frequency components.

The process begins at a Start Process state (Step 402). The transformed spectrum of an input signal sample is scanned for local peaks for frequencies up to a maximum frequency of $f_{max}$ in order to "pick" a peak (Step 404). A local peak is declared at P(f) if P(f−1)<P(f)>P(f+1). The peaks that stand above the neighboring spectrum values by more than a threshold ϵ, i.e., those f for which P(f−1)+ϵ<P(f)>P(f+1)+ϵ, are extracted (Step 406). Each of those peaks represents one "vote" for each of the fundamental frequencies $f_0$ (Step 408). The preferred embodiment estimate of $V_0(f_0)$ is floor ($f_{max}/f_0$). Since lower values of $f_0$ have fewer harmonics for a given $f_{max}$ than higher $f_0$, the votes are normalized by the expected number of harmonics in the frequency range considered $V_0(f_0)$ (Step 410). If the ratio $V(f_0)/V_0(f_0)$ is greater than a threshold (Step 412), a harmonic relationship is declared to exist.

Pattern Matching

Figure 5:
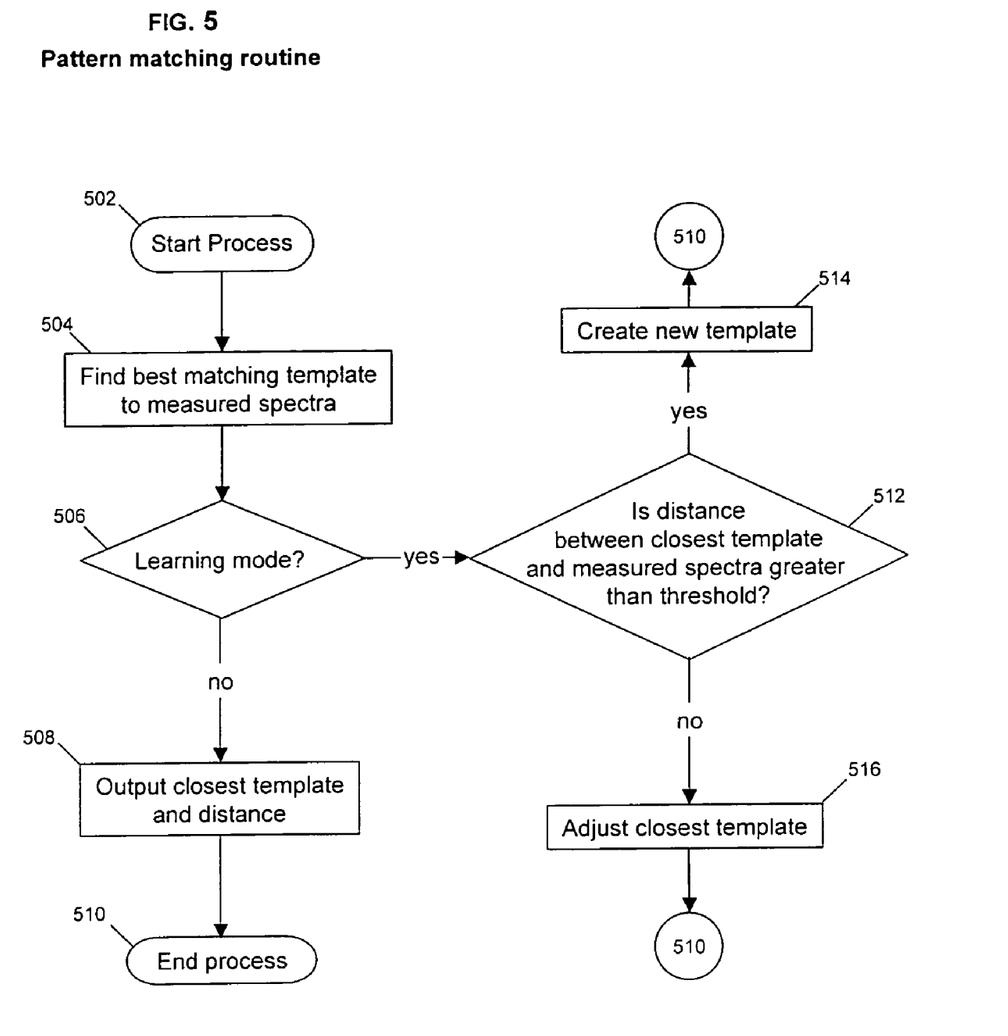
FIG. 5 is a flow diagram showing a preferred method for generating and using signal model templates.

FIG. 5 is a flow diagram providing a more detailed description of the process of pattern matching which was briefly described as Step 216 of FIG. 2. The process begins at a Start Process state (Step 502). The pattern matching process finds a template T* in the signal model that best matches a current spectrogram P(f, i) (Step 504). The pattern matching process is also responsible for the learning process of the signal model. There exists some latitude in the definition of the term "best match", as well as in the method used to find that best match. In one embodiment, the template with the smallest r.m.s. difference d* between P+k and T* is found. In the preferred embodiment, the weighted r.m.s. distance is used to measure the degree of match. In one embodiment, the r.m.s. distance is calculated by:

$$d(i, m) = \frac{1}{N}\sum_{f=1}^{N} [P(f, i) + k(i, m) - T(f, m)]^2 w_2'(f, i, m)$$

In this embodiment, the frequency bands with the least SNR contribute less to the distance calculation than those bands with more SNR. The best matching template T*(f, i) that is the output of Step 504 at time i is selected by finding m such that d*(i)=$\min_m$[d(i, m)]. If the system is not in learning mode (Step 506), then T*(f, i) is also the output of the process as being the closest template (Step 508). The process then ends (Step 510)

If the system is in learning mode (Step 506), the template T*(f, i) most similar to P(f, i) is used to adjust the signal model. The manner in which T*(f, i) is incorporated in the model depends on the value of d*(i) (Step 512). If d*(i)< $d_{max}$, where $d_{max}$ is a predetermined threshold, then T*(f, i)

is adjusted (Step 516), and the process ends (Step 510). The preferred embodiment of Step 516 is implemented such that $T^*(f, i)$ is the average of all spectra $P(f, i)$ that are used to compose $T^*(f, i)$. In the preferred embodiment, the number $n_m$ of spectra associated with $T(f, m)$ is kept in memory, and when a new spectrum $P(f, i)$ is used to adjust $T(f, m)$, the adjusted template is:

$$T(f,m)=[n_m T(f,m)+P(f,i)]/(n_m+1),$$

and the number of patterns corresponding to template m is adjusted as well:

$$n_m=n_m+1$$

Referring back to Step 512, if $d^*(i)>d_{max}$, then a new template is created, $T^*(f, i)=P(f, i)$, with a weight $n_m=1$ (Step 514), and the process ends (Step 510).

Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. Each such programmable system component constitutes a means for performing a function. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. For example, some of the steps of various of the algorithms may be order independent, and thus may be executed in an order other than as described above. Accordingly, other embodiments are within the scope of the following claims.

What is claimed is:

1. A method for classifying acoustic signal within a digitized acoustic input signal, including:
    (a) transforming the digitized acoustic input signal to a time-frequency representation;
    (b) isolating transient sounds within the time-frequency representation;
    (c) estimating background noise and including long transients without signal content and background noise between transients in such estimating;
    (d) detecting the presence of harmonics in the time-frequency representation;
    (e) rescaling the time-frequency representation;
    (f) comparing the rescaled time-frequency representation of each transient sound containing any signal of interest with a plurality of time-frequency spectrogram templates in a first signal model, in response to detecting the presence of harmonics, and determining a matching spectrogram template that best matches the rescaled time-frequency representation, based in part on distance between the rescaled time-frequency representation and the plurality of time-frequency spectrogram templates; and
    (g) assigning the digitized acoustic input signal to the first signal model based on the matching spectrogram template.

2. The method of claim 1, where the step of assigning further includes the step of rejecting a second signal model that is does not meet a selected score threshold.

3. A system for classifying acoustic signal within a digitized acoustic input signal, including:
    (a) computational means for transforming the digitized acoustic input signal to a time-frequency representation;
    (b) computational means for isolating transient sounds within the time-frequency representation;
    (c) computational means for estimating background noise and including long transients without signal content and background noise between transients in such estimating;
    (d) computational means for detecting the presence of harmonics in the time-frequency representation;
    (e) computational means for rescaling the time-frequency representation;
    (f) computational means for comparing the rescaled time-frequency representation of each transient sound containing any signal of interest with a plurality of time-frequency spectrogram templates in a first signal model, in response to detecting the presence of harmonics, and determining a matching spectrogram template that best matches the rescaled time-frequency representation, based in part on distance between the rescaled time-frequency representation and the plurality of time-frequency spectrogram templates; and
    (g) computational means for assigning the digitized acoustic input signal to the first signal model based on the matching spectrogram template.

4. The system of claim 3, further including computational means for rejecting a second signal model that is does not meet a selected score threshold.

5. A computer program, residing on a computer-readable medium, for classifying acoustic signal within a digitized acoustic input signal, the computer program comprising instructions for causing a computer to:
    (a) transform the digitized acoustic input signal to a time-frequency representation;
    (b) estimate a background noise level in the time-frequency representation;
    (c) for each interval of the time-frequency representation containing significant signal levels, compare the time-frequency representation of such interval, in response to estimating the background noise level to be below a pre-selected threshold, with a plurality of time-frequency spectrogram templates in a first signal model, and determine a matching spectrogram template that best matches the time-frequency representation of such interval, based in part on distance between the time-frequency representation of such interval and the plurality of time-frequency spectrogram templates; and (d) assign the digitized acoustic input signal to the first signal model based on the matching spectrogram template.

6. The computer readable medium of claim 5, further comprising instructions for causing the computer to:

rescale the time-frequency representation according to a signal-to-noise ratio of the time-frequency representation.

7. The computer readable medium of claim 5, further comprising instructions for causing the computer to:

rescale the time-frequency representation with a weight that increases with increasing signal-to-noise ratio of the time-frequency representation.

8. A computer program, residing on a computer-readable medium, for classifying acoustic signal within a digitized acoustic input signal, the computer program comprising instructions for causing a computer to:

(a) transform the digitized acoustic input signal to a time-frequency representation;

(b) isolate transient sounds within the time-frequency representation;

(c) estimate background noise and including long transients without signal content and background noise between transients in such estimating;

(d) detect the presence of harmonics in the time-frequency representation;

(e) rescale the time-frequency representation;

(f) compare the rescaled time-frequency representation of each transient sound containing any signal of interest with a plurality of time-frequency spectrogram templates in a first signal model in response to detecting the presence of harmonics, and determine a matching spectrogram template that best matches the rescaled time-frequency representation, based in part on distance between the rescaled time-frequency representation and the plurality of time-frequency spectrogram templates; and (g) assign the digitized acoustic input signal to the first signal model based on the matching spectrogram template.

9. The method of claim 8, further including instructions for causing a computer to reject a second signal model that is does not meet a selected score threshold.

10. An acoustic signal classifier, comprising:

an input device for receiving an acoustic signal;

a memory comprising a classification program that:

transforms the acoustic signal into an input time-frequency representation;

detects harmonics in the input time-frequency representation;

matches, in response to detected harmonics in the acoustic signal, the input time-frequency representation with a plurality of time-frequency spectrogram templates in a first signal model and in a second signal model;

determines distances between the input time-frequency representation and the time-frequency spectrogram templates in the first and second signal models; and classifies the acoustic signal as corresponding to at least one of the first or second signal models based on the distances; and a processor coupled to the memory for executing the classification program.

11. An acoustic signal classifier according to claim 10, where the classification program also scales the input time-frequency representation according to a weight that increases with increasing signal to noise-to-noise ratio of the input time-frequency representation.

12. An acoustic signal classifier according to claim 10, where the classification program also detects harmonic content in the input time-frequency representation and proceeds with pattern matching when harmonic content is present.

13. An acoustic signal classifier according to claim 10, where the classification program also determines a power level as a function of time and frequency for the input time-frequency representation and estimates a background nose level, and proceeds with pattern matching when the power level exceeds the background noise level by a pre-selected threshold.

14. An acoustic signal classifier according to claim 13, where the pre-selected threshold is a pre-selected number of standard deviations beyond a mean background noise level.

* * * * *

UNITED STATES PATENT AND TRADEMARK OFFICE
CERTIFICATE OF CORRECTION

| | | |
|---|---|---|
| PATENT NO. | : 7,117,149 B1 | Page 1 of 1 |
| APPLICATION NO. | : 09/385975 | |
| DATED | : October 3, 2006 | |
| INVENTOR(S) | : Pierre Zakarauskas | |

It is certified that error appears in the above-identified patent and that said Letters Patent is hereby corrected as shown below:

On the Title Page

Item (57), line 13, under "ABSTRACT", replace "resealing" with --rescaling--.

In the Specification

In column 6, line 8, replace "resealing" with --rescaling--.

In the Claims

In column 10, claim 2, line 22, before "does not meet" delete "is".

In column 10, claim 3, line 36, before "the time-frequency" replace "resealing" with --rescaling--.

In column 10, claim 4, line 52, after "signal model that" delete "is".

In column 12, claim 9, line 3, before "does not meet" delete "is".

Signed and Sealed this

Fifteenth Day of June, 2010

David J. Kappos
*Director of the United States Patent and Trademark Office*